United States Patent
Etchegoyen et al.

(10) Patent No.: US 10,880,677 B2
(45) Date of Patent: *Dec. 29, 2020

(54) METHOD AND SYSTEM FOR IMPLEMENTING ZONE-RESTRICTED BEHAVIOR OF A COMPUTING DEVICE

(71) Applicant: Uniloc 2017 LLC, Newport Beach, CA (US)

(72) Inventors: Craig S. Etchegoyen, Newport Beach, CA (US); Dono Harjanto, Newport Beach, CA (US); Sean D. Burdick, Boise, ID (US)

(73) Assignee: Uniloc 2017 LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/272,985

(22) Filed: Feb. 11, 2019

(65) Prior Publication Data

US 2019/0191272 A1    Jun. 20, 2019

Related U.S. Application Data

(63) Continuation of application No. 13/734,175, filed on Jan. 4, 2013, now Pat. No. 10,206,060.

(60) Provisional application No. 61/583,126, filed on Jan. 4, 2012.

(30) Foreign Application Priority Data

Apr. 24, 2012    (AU) ................................. 2012100640

(51) Int. Cl.
*G06F 21/00* (2013.01)
*H04W 12/08* (2009.01)
*H04W 4/021* (2018.01)
*H04L 29/06* (2006.01)

(52) U.S. Cl.
CPC ........... *H04W 4/021* (2013.01); *H04L 63/107* (2013.01); *H04W 12/08* (2013.01)

(58) Field of Classification Search
CPC ...... H04W 4/021; H04W 12/08; H04L 63/107
See application file for complete search history.

(56) References Cited

U.S. PATENT DOCUMENTS

| | | | |
|---|---|---|---|
| 2005/0149728 A1* | 7/2005 | Saffre .................... | G06F 21/51 713/166 |
| 2008/0076572 A1* | 3/2008 | Nguyen .............. | G07F 17/3269 463/42 |
| 2008/0311994 A1* | 12/2008 | Amaitis .............. | G07F 17/3239 463/39 |

(Continued)

*Primary Examiner* — Alexander Lagor
(74) *Attorney, Agent, or Firm* — Burdick Patents, P.A.; Sean D. Burdick (57) ABSTRACT

A method for implementing zone-restricted behavior of a computing device includes identifying wireless access points using the computing device, determining a number of authorized wireless access points from the wireless access points identified by the computing device, determining that the computing device is located within a restricted access zone when the number of authorized wireless access points identified by the computing device exceeds a predetermined threshold of authorized wireless access points identified, and enabling a zone mode of the computing device when the computing device is determined to be located within the restricted access zone.

14 Claims, 8 Drawing Sheets

(56) References Cited

U.S. PATENT DOCUMENTS

2011/0090896 A1* 4/2011 Bradley ................ H04W 24/02
370/350
2012/0275354 A1* 11/2012 Villain .................. H04W 28/04
370/281

* cited by examiner

METHOD AND SYSTEM FOR IMPLEMENTING ZONE-RESTRICTED BEHAVIOR OF A COMPUTING DEVICE

This application is a continuation of and claims priority to U.S. application Ser. No. 13/734,175 filed Jan. 4, 2013, which claims priority to U.S. Provisional Application No. 61/583,126 filed Jan. 4, 2012, both of which are fully incorporated herein by reference.

BACKGROUND OF THE INVENTION

1. Field of the Invention

The present invention relates generally to a method and system for implement zone-restricted behavior of a computing device.

2. Description of the Related Art

The ability to perform certain activities within a specific zone has become desirable in various areas, such as in gaming, music distribution, file distribution, or secured access to certain information. For example, electronic gaming, in the sense of wagering games, has become a very large segment of on-line data services. While many still patronize casinos and other business establishments in which gaming is legal, many also enjoy bringing the gaming experience home and do so through gaming software that can replicate much of the gaming experience using personal computing devices.

However, gambling is heavily regulated by governments. Accordingly, what may be permissible in a casino may not be permissible just outside the casino, not even in the parking lot. Thus, gaming software that is intended for home consumers does not include wagering features that permit actual gambling to occur. At best, the home consumer may enjoy a simulated or virtual wagering game.

Virtual wagering in the gaming software allows a user to experience virtual gaming outside the casino on the user's computing device. The user may enjoy the experience so much that she develops a preference for using the gaming software. When the user enters the casino, for example, with virtual gaming software available on her mobile device or smart phone, she may wish to continue playing the virtual game, but instead opts to play another game (such as a video poker or slot machine) because it allows for real gambling.

In view of advancements in and popularity of personal, mobile computing devices, it is perceived that users of such devices would prefer a seamless transition while using such a device for gaming inside and outside of a casino. In other words, the user may wish to perform certain restricted behaviors using the mobile computing device when the device is carried within a zone in which such behavior are permissible. However, the exact determination of when the user's computing device is inside the casino or any other specific zone is difficult.

Thus, there is a need for an improved method and system for implementing zone-restricted behavior of a computing device.

SUMMARY OF THE INVENTION

In accordance with the present invention, whether a given computing device is within a restricted access zone can be accurately determined. Accordingly, zone restricting logic on such a computing device can enable a zone mode of the computing device only when the computing device is located within the restricted access zone. For example, the zone restricting logic on the computing device can allow wagering only when the computing device is within a precisely defined interior space of a casino.

It is particularly challenging to distinguish between a computing device just inside a restricted access zone and one just outside the restricted access zone, both of which are connected to a local area network wirelessly. To make this distinction, each of one or more authorized wireless access points within the restricted access zone transmits wireless access point identifiers. The computing device utilizes the wireless access point identifiers to identify the authorized wireless access points. If the number of authorized wireless access points identified by the computing device is at least the predetermined threshold of authorized wireless access points, the computing device is determined to be within the restricted access zone. If not, the computing device is determined to be outside the restricted access zone.

In an electronic gaming example, from the user's perspective, the gaming experience is the same both inside and outside the casino with one exception. Upon entering the casino as detected in the manner described herein, the zone restricting logic of the user's computing device enables a zone mode such as a wagering mode and provides the user with a user interface by which the wagering mode can be activated. While inside the restricted zone of the casino, the user can continue to engage in wagered gaming. However, when the user carries her computing device outside the casino as determined in the manner described herein, the zone restricting logic disables the wagering mode and only non-wagered gaming is available to the user.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. In the drawings, like reference numerals may designate like parts throughout the different views, wherein:

DETAILED DESCRIPTION

The present invention relates to a method and system for implementing zone-restricted behavior of a computing device.

Figure 1:
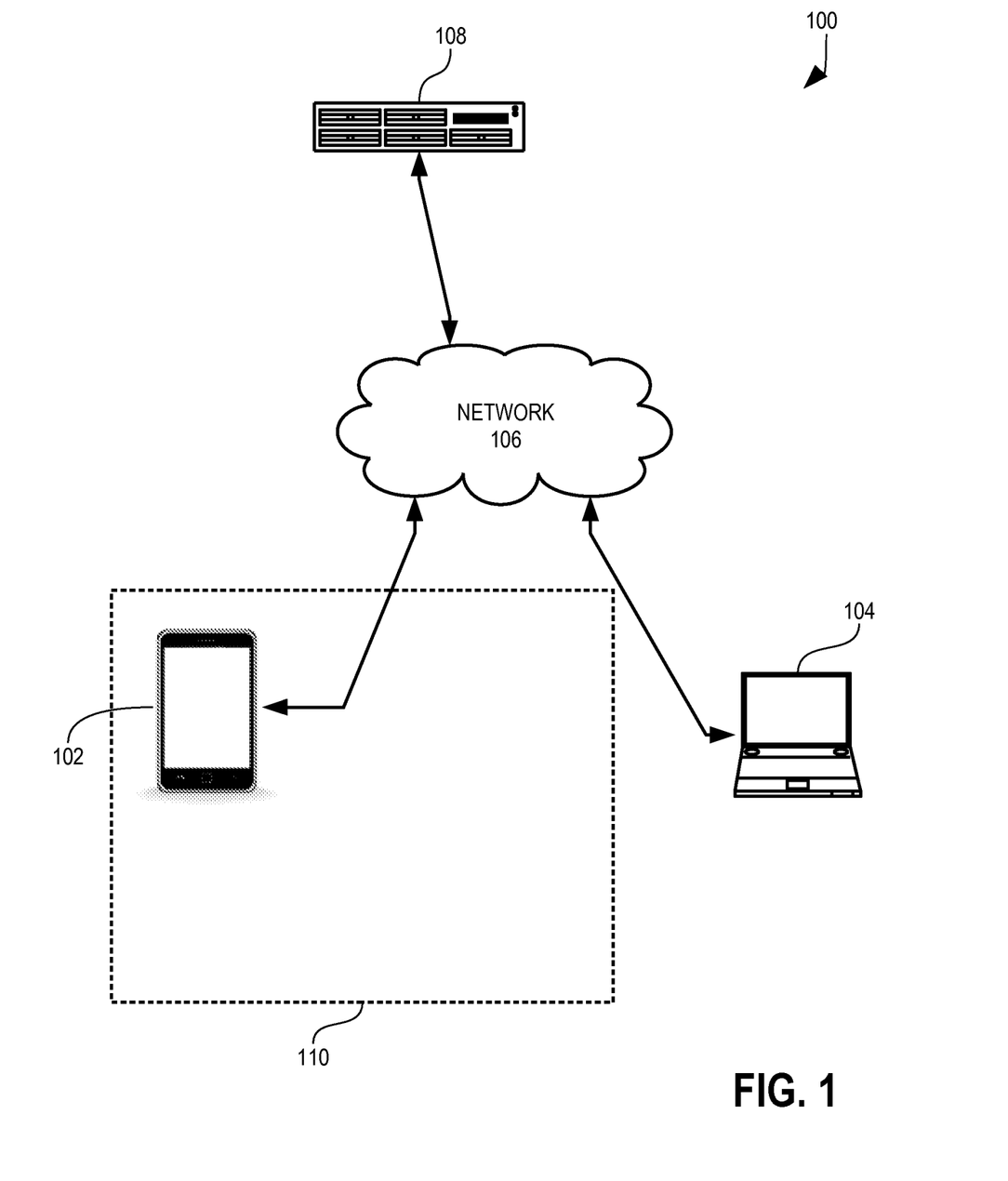
FIG. 1 is a block diagram showing a restricted access server that interacts with computing devices to allow execution of restricted features when the computing devices are within a restricted access zone and vice versa, in accordance with an embodiment of the present invention.

As seen in FIG. 1, a system for implementing zone-restricted behavior of a computing device 100 can include, for example, a computing device 102, a computing device 104, and a restricted access server 108. The computing device 102, the computing device 104, and the restricted access server 108 can be connected to each other through a network 106. The network 106 can be, for example, the Internet, a telephone network, a wide area network, a local area network, or any combination thereof. Computing devices 102 and 104 are preferably mobile devices such as smart phones and laptop computers.

Generally, the computing device 102 or 104 is enabled to be in a zone mode when the computing device 102 or 104 is located within a restricted access zone 110. Otherwise, they will be in a non-zone mode. As seen in FIG. 1, the computing device 102 is located within the restricted access zone 110, and is therefore enabled to be in the zone mode. However, the computing device 104 is located outside the restricted access zone 110 and is therefore disabled from being in the zone mode. Instead, the computing device 104 is in the non-zone mode.

Generally, restricted access zone 110 is a volume in space. For example, the restricted access zone 110 can be a fixed, predefined zone such as any interior space of a building or structure such as one or more rooms within a building. The restricted access zone 110, however, can also include enclosed or partially enclosed volumes. Furthermore, the restricted access zone 110 can also include any bound geographic area for which the computing devices 102 and 104 should be in a zone mode when they are located in the bound geographic area, and should be in a non-zone mode when they are located outside the bound geographic area.

In an embodiment, the zone mode unlocks features of an application on the computing devices 102 and 104. The zone mode can include, for example, a wagering mode, music playing mode, secure access to documents mode, or any other type of mode which permits certain activities to occur only when executed within the bound geographic area. For example, the restricted access zone 110 may be a casino, and the zone mode may be a wagering mode such that when the computing device 102 or 104 is physically located within the boundary of the casino, a user may place a wager or gamble using the computing device 102 or 104, but when the computing device 102 or 104 is physically located outside the casino, the zone mode is disabled so that the user may not place a wager or gamble using the computing device 102 or 104.

Various authorized wireless access points may be deployed within the restricted access zone 110. The authorized wireless access points are wireless access points which are utilized by the system 100 to enable a determination whether the computing device 102 or 104 is located within the restricted access zone 110. The authorized wireless access points can be strategically placed to enable such a determination. Furthermore, the authorized wireless access point can connect to the restricted server 110 in a known manner, such as with a local or known IP address. An authorized wireless access point differs from other wireless access points in that they are known to the system 100 and their characteristics can be controlled to ensure the proper determination of the locations of the computing devices 102 and 104. In the context of the present invention, a router is one example of a wireless access point.

For the computing device 102 or 104 to be considered to be located within the restricted access zone, the computing device 102 or 104 is required to identify more than a predetermined threshold of authorized wireless access points. Such a process will be described in more detail below. Examples of restricted access zones and configurations of authorized wireless access points within the restricted access zones can be seen, for example, in FIGS. 4-6.

Figure 2:
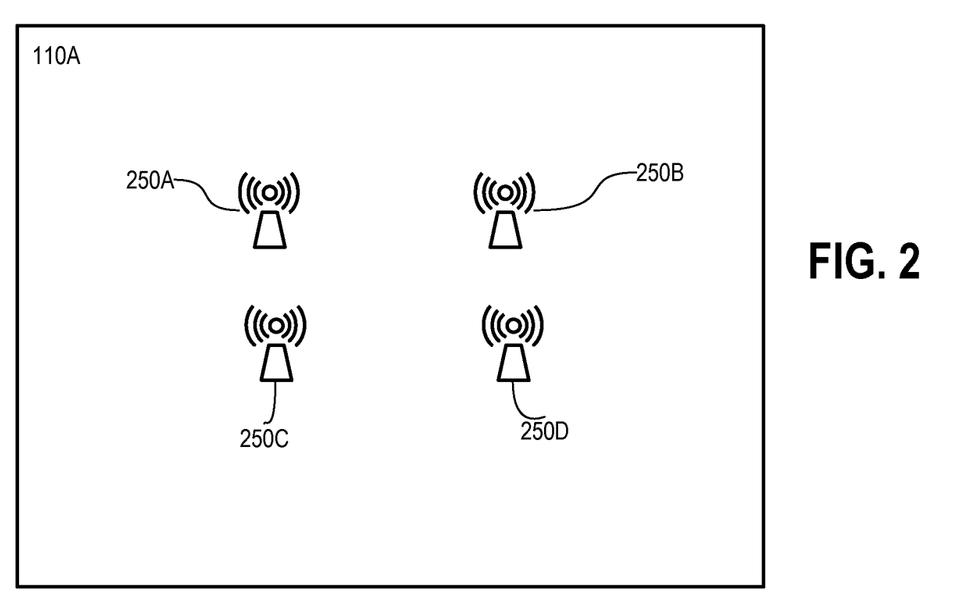
FIG. 2 is a block diagram showing a local area network configuration of the restricted access zone of FIG. 1 according to an embodiment of the present invention.

In FIG. 2, the wireless access points 250A-D located in the restricted access zone 110A are omnidirectional wireless access points, each of which is an authorized wireless access point. Since the wireless access points 250A-D are omnidirectional wireless access points, they are placed well within the boundaries of a restricted access zone 110A so that the strength of signals broadcast by the wireless access points diminish outside the restricted access zone.

There may be locations within the restricted access zone 110A at which the computing devices 102 or 104 may be unable to identify more than the predetermined threshold of authorized wireless access points. In such circumstances, such locations will be a "blind spot" in which the computing devices 102 or 104 are erroneously determined to be outside the restricted access zone 110A. Such a false negative is less worrisome than a false positive in which the computing devices 102 or 104 are permitted to enable the zone mode when outside the restricted access zone 110A. If the blind spots are significant in number, a human operator can reposition one or more of the authorized wireless access points 250A-D or add additional authorized wireless access points to provide better coverage within the restricted access zone 110A without significantly enhancing coverage outside the restricted access zone 110A.

Figure 3:
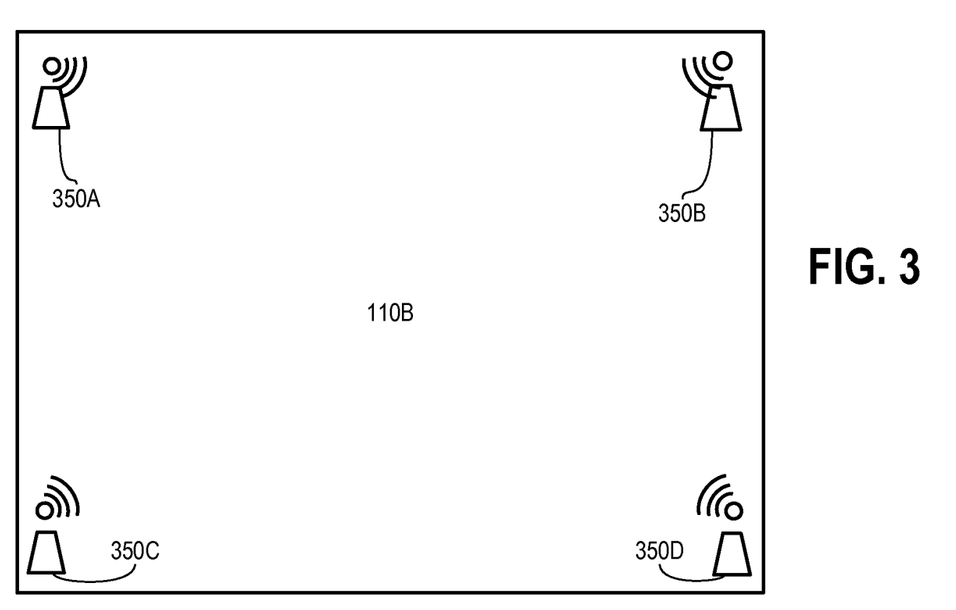
FIG. 3 is a block diagram showing a local area network configuration of the restricted access zone of FIG. 1 according to another embodiment of the present invention.

In FIG. 3, the wireless access points 350A-D located in the restricted access zone 110B are unidirectional wireless access points, each of which are authorized wireless access points. Since the wireless access points 350A-D are unidirectional wireless access points, they are placed about the periphery of the restricted access zone 110B and aimed inward, so that the strength of signals broadcast by the wireless access points diminish outside the restricted access zone.

Figure 4:
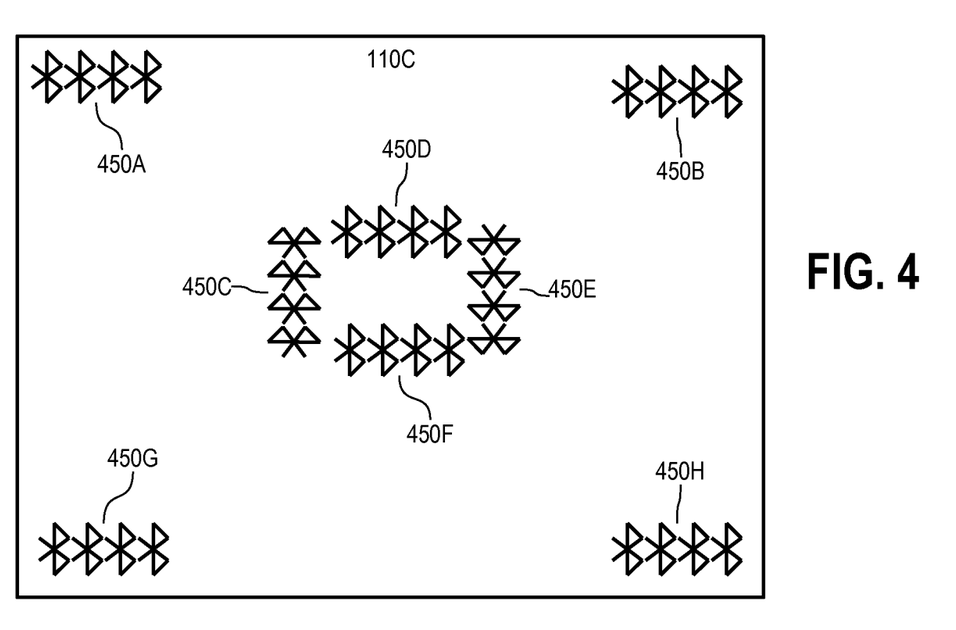
FIG. 4 is a block diagram showing a local area network configuration of the restricted access zone of FIG. 1 according to another embodiment of the present invention.

In FIG. 4, the array of wireless access points 450A-H located in the restricted access zone 110C are short range, single connection, wireless access points, each of which is an authorized wireless access point. Since each of the short range, single connection, wireless access points can support only a single computing device, many are distributed throughout restricted access zone 110C. In one embodiment, the array of wireless access points 450 A-H use the known Bluetooth® wireless connectivity standard. However, when connected a short range, single connection, wireless access points is connected to a computing device, it may not be identifiable by another computing device. In such a case, redundant short range, single connection, wireless access points may need to be included to ensure that a sufficient amount of authorized wireless access points are identifiable so that a determination can be made as to whether the computing device 102 is located within the restricted access zone 110C. In an embodiment, the number of redundant short range, single connection, wireless access points which may be utilized can be equal to or greater than the predetermined threshold of authorized wireless access points identified.

Figure 5:
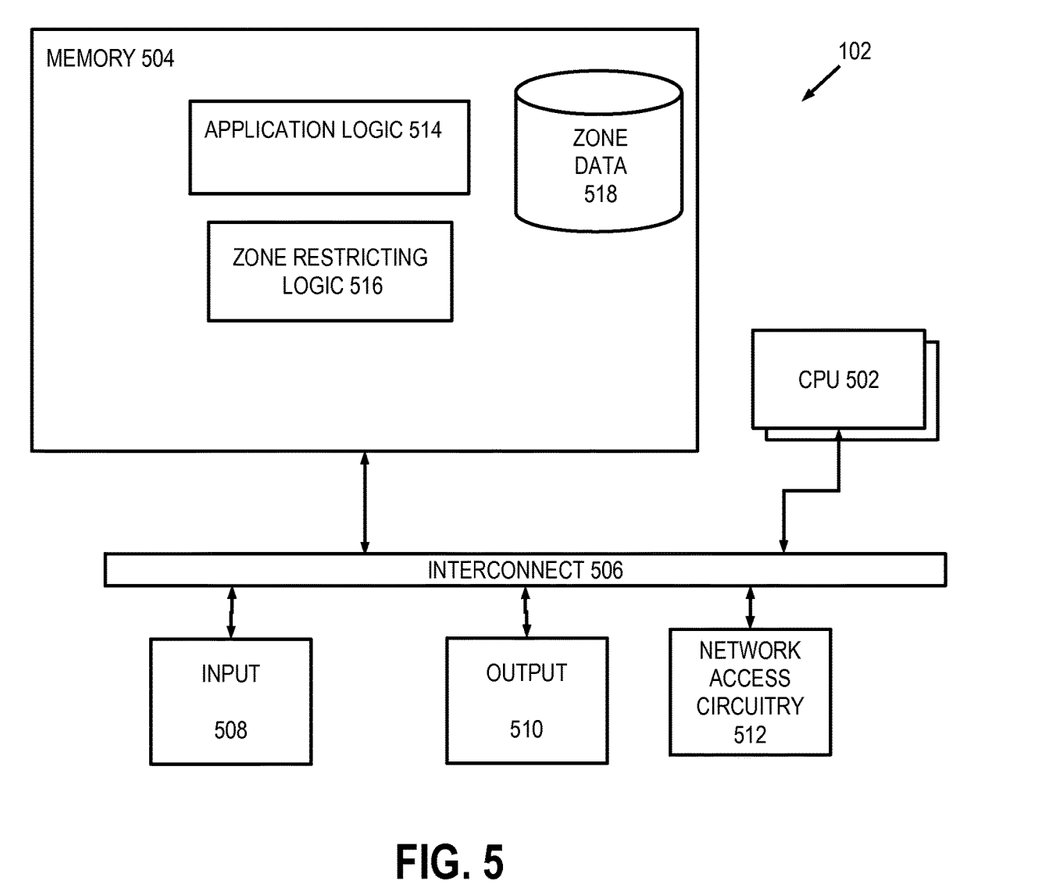
FIG. 5 is a block diagram showing the computing device of FIG. 1 in greater detail according to an embodiment of the present invention.
Figure 6:
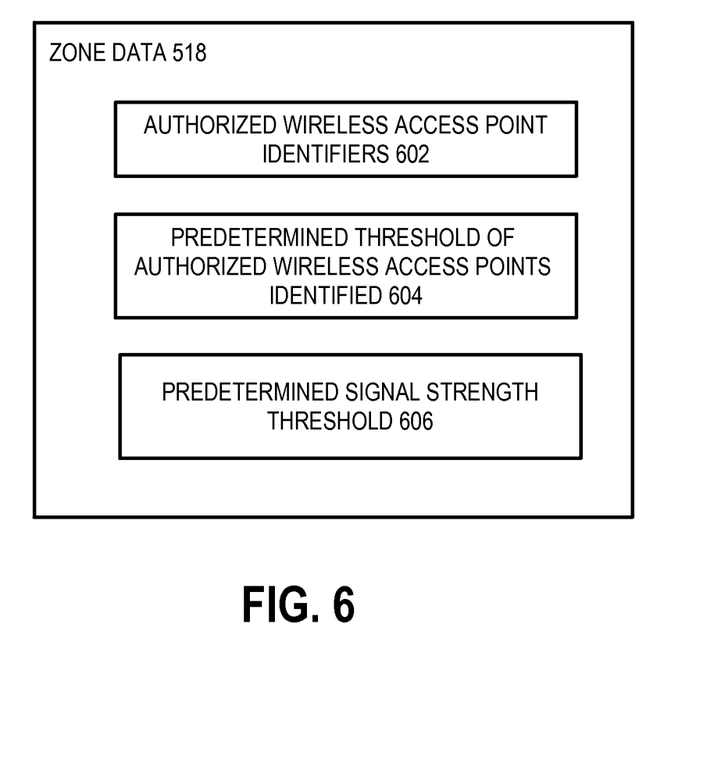
FIG. 6 is a block diagram illustrating zone data stored in memory of the computing device of FIG. 5 according to an embodiment of the present invention.

It should be appreciated that any of the wireless access point configurations of FIGS. 4-6 can be used in combination. In addition, conductive material can be included in walls, floors, and ceilings to make a Faraday cage and further restrict signal strength outside of the restricted access zone 110.

As seen in FIG. 5, the computing device 102 is disclosed in more detail. The computing device 104 is analogous to the computing device 102 and the description herein of the computing device 102 is equally applicable to the computing device 104 unless otherwise noted herein. The computing device 102 generally can be any type of portable personal computing device, such as a laptop, a mobile phone, a personal digital assistant, music player, or any other type of computing device which is portable.

In FIG. 5, the computing device 102 can include, for example one or more microprocessors, which are collectively shown as CPU 502. The computing device 102 also includes, for example, a memory 504, an interconnect 506, an input 508, an output 510, and/or a network access circuitry 512. The CPU 502 can retrieve data and/or instructions from the memory 504 and execute the retrieved instructions. The memory 504 can include generally any computer-readable medium including, for example, persistent memory such as magnetic and/or optical disks, ROM, and PROM and volatile memory such as RAM.

The CPU 502 and the memory 504 are connected to one another through the interconnect 506, which is a bus in this illustrative embodiment. The interconnect 506 connects the CPU 502 and the memory 504 to the input devices 508, the output devices 510, and the network access circuitry 512. The input devices 508 can include, for example, a keyboard, a keypad, a touch-sensitive screen, a mouse, a microphone, and/or one or more cameras. The output devices 510 can include, for example, a display-such as a liquid crystal display (LCD)—and/or one or more loudspeakers. The network access circuitry 512 sends and receives data through computer networks such the network 106 (FIG. 1).

A number of components of the computing device 102 are stored in the memory 504. In particular, an application logic 514 is part of one or more computer processes executed within the CPU 502 from the memory 504 in this illustrative embodiment, but can also be implemented using digital logic circuitry. As used herein, "logic" refers to (i) logic implemented as computer instructions and/or data within one or more computer processes and/or (ii) logic implemented in electronic circuitry.

In an embodiment, the application logic 514 is executable software stored within the memory 504. For example, when the user desires to utilize an application in the computing device 102 the computing device 102 executes the application logic 514 to enable the user to utilize the application. The application may interact, for example, with the restricted access server 108 to deliver features to the user.

The application can include, for example, various features that may be locked or unlocked based on the location of the computing device 102. Such features may be termed restricted features. Furthermore, the restricted features may include restricted features from the restricted access server 108. For example, if the computing device 102 is located within the restricted access zone 110, the restricted features of the application may be unlocked and usable by the user, whereas if the computing device 102 is located outside the restricted access zone 110, the restricted features of the application may be locked and unusable by the user. As in the example noted above where the restricted access zone 110 is a casino, the restricted feature may be the wagering feature, which may be unlocked and usable by the user when the computing device 102 is located within the restricted access zone 110.

The computing device 102 can also include a zone restricting logic 516 and a zone data 518. The zone restricting logic 516 can determine whether the computing device 102 is located within the restricted access zone 110, or outside the restricted access zone 110. Based on the location of the computing device 102, the zone restricting logic 516 can enable the zone mode of the computing device 102, thereby unlocking the restricted features of the application.

To determine the location of the computing device 102, the zone restricted logic 516 can utilize information contained in the zone data 518. As seen in FIG. 6, the zone data 518 can include, authorized wireless access points identifiers 602, and a predetermined threshold of authorized wireless access points identified 604. Optionally the zone data 518 can also include a predetermined signal strength threshold 606.

The authorized wireless access point identifiers 602 indicate the wireless access point identifiers of authorized wireless access points. The wireless access point identifiers can include the Extended Service Set Identification (ESSID), Internet Protocol (IP) address, the Media Access Control (MAC) address, and/or a device fingerprint of the wireless access point. In an embodiment, the wireless access points can transmit the wireless access point identifiers.

Digital fingerprints are known and are described, e.g., in U.S. Pat. No. 5,490,216 (sometimes referred to herein as the '216 Patent), and in U.S. Patent Application Publications 2007/0143073, 2007/0126550, 2011/0093920, and 2011/0093701 (collectively, "the related U.S. Patent Applications"), the descriptions of which are fully incorporated herein by reference. Briefly, a digital fingerprint is a unique identifiers of an individual computing device that is derived from data stored on the device that identifies individual components of hardware or software or the system configuration of the device.

A digital fingerprint or "device fingerprint" may comprise a bit string or bit array that includes or is derived from user-configurable and non-user-configurable data specific to the computing device 102 or 104. Non-user-configurable data includes data such as hardware component model numbers, serial numbers, and version numbers, and hardware component parameters such as processor speed, voltage, current, signaling, and clock specifications. User-configurable data includes data such as registry entries, application usage data, file list information, and MAC address. In an embodiment, a device fingerprint can also include, for example, manufacture name, model name, and/or device type of the remote computing device 104.

Generation of a device fingerprint may include a combination of operations on the data specific to the computing device being fingerprinted, which may include processing using a combination of sampling, concatenating, appending (for example, with a nonce value or a random number), obfuscating, hashing, encryption, and/or randomization algorithms to achieve a desired degree of uniqueness. For example, the desired degree of uniqueness may be set to a practical level such as 99.999999% or higher, to achieve a probability of less than 1 in 100,000,000 that any two remote computing devices will generate identical fingerprints.

The predetermined threshold of authorized wireless access points identified 604 indicates the minimum number of authorized wireless access points that the computing device 102 must identify before the computing device 102 is considered to be located within the restricted access zone 110. The predetermined signal strength threshold 606 indicates a minimum signal strength that a wireless access point must have, as detected by the computing device 102, before it is identified by the computing device 102.

The computing device 102 can receive the zone data 518 or portions of the zone data 518 from the restricted access server 108. In an embodiment, the zone data 518 can be periodically updated.

The zone restricting logic 516 can identify wireless access points. In one embodiment, the zone restricting logic 516 can identify only wireless access points that have a signal strength greater than the predetermined signal strength threshold 606. If the signal strength of the wireless access point is greater than the predetermined signal strength threshold 606, then the zone restricting logic 516 will identify the wireless access point. Otherwise, the zone restricting logic 516 will not identify the wireless access point.

The zone restricting logic 516 can also determine for each of the wireless access points identified whether it is an authorized wireless access point (or not) based on the wireless access point identifier provided by each of the wireless access points. The zone restricting logic 516 can compare to the wireless access point identifier provided by each of the wireless access points with the list of authorized wireless access point identifiers 602. If there is a match, then the wireless access point is an authorized wireless access point. Then the zone restricting logic 516 can determine a number of authorized wireless access points identified. The zone restricting logic 516 determines that the computing device is located within the restricted access zone 110 when the number of authorized wireless access points identified exceeds the predetermined threshold of authorized wireless access points identified 604. Otherwise, the zone restricting logic 516 determines that the computing device 102 is located outside the restricted access zone 110.

Optionally, the zone restricting logic 516 can also require that the computing device 102 is connected through one of the authorized wireless access points to the restricted access server 108 before the zone restricting logic 516 determines that the computing device is located within the restricted access zone 102. For example, the zone restricting logic 516 can connect the computing device 102 to the restricted access server 108 through one of the authorized wireless access points if it has not done so already. The zone restricting logic 516 can send data to the restricted access server 108, and wait for verification from the restricted access server 108 that the computing device 102 is connected through one of the authorized wireless access points. The zone restricting logic 516 can determine that the computing device 102 is located in the restricted access zone 110 responsive to receiving verification from the restricted access server 108.

For example, the data sent by the zone restricting logic 516 to the restricted access server 108 can include one or more of (i) a wireless access point identifier of the access point through which the computing device 102 is connected to server 108, (ii) wireless access point identifiers of all other wireless access points broadcasting a signal that satisfies the signal strength threshold 606, and (iii) a digital fingerprint or other identifier that uniquely identifies the computing device 102.

When the zone restricting logic 516 determines that the computing device 102 is located within the restricted access zone 110, the zone restricting logic 516 enables a zone mode of the computing device 102. For example, by enabling the zone mode of the computing device 102, the zone restricting logic 516 can unlock the restricted features of the application logic 514.

In an alternative embodiment, the application logic 514, and/or the zone restricting logic 516, are implemented as a "thin client", i.e., as logic received from the restricted access server 108 and executed in a web browser, optionally including plug-ins.

Figure 7:
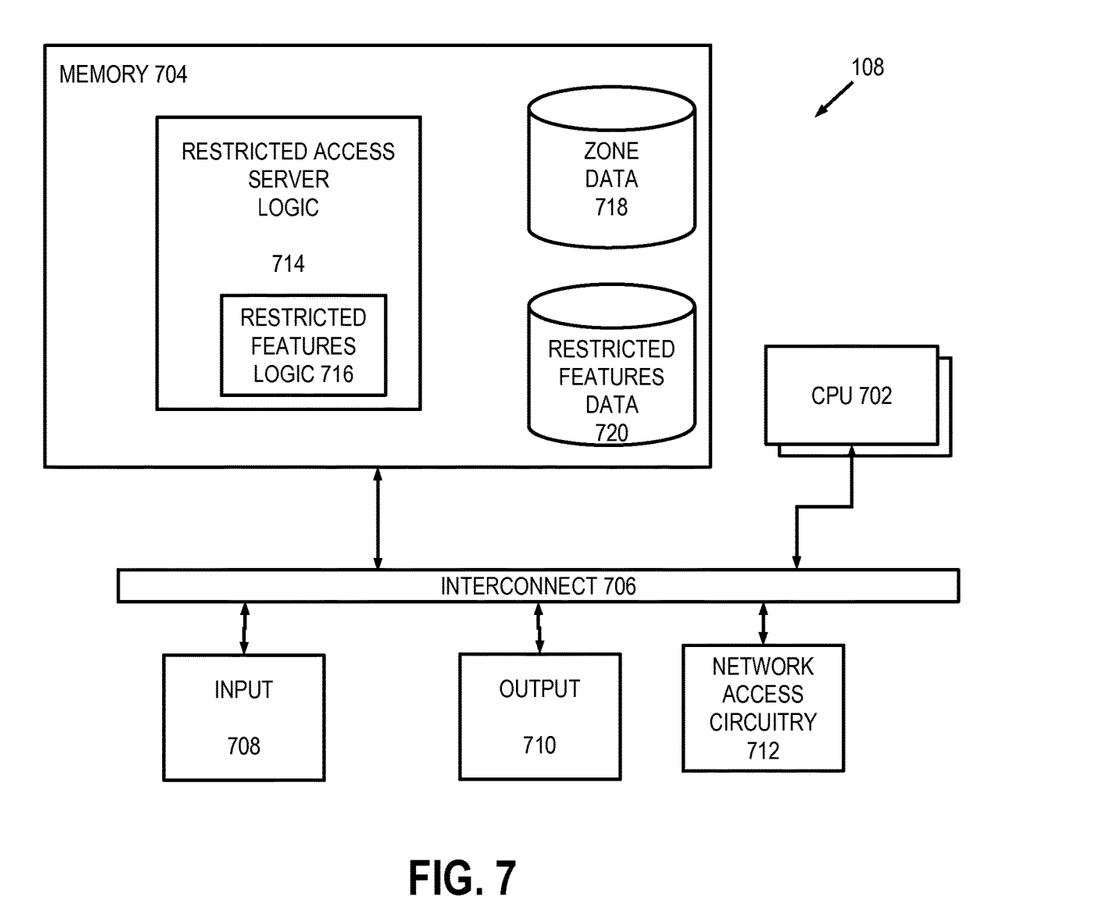
FIG. 7 is a block diagram showing the restricted access server computer of FIG. 1 in greater detail according to an embodiment of the present invention.

As seen in FIG. 7 the restricted access server 108 can include, for example one or more microprocessors, which are collectively shown as CPU 702. In an embodiment, the restricted access server 108 can be, for example, a gaming server, a music server, a file server, a secure access server, or any other type of server which can distribute restricted information. The restricted access server 108 also includes, for example, a memory 704, an interconnect 706, an input 708, an output 710, and/or a network access circuitry 712. The CPU 702 can retrieve data and/or instructions from the memory 704 and execute the retrieved instructions. The memory 704 can include generally any computer-readable medium including, for example, persistent memory such as magnetic and/or optical disks, ROM, and PROM and volatile memory such as RAM.

The CPU 702 and the memory 704 are connected to one another through the interconnect 706, which is a bus in this illustrative embodiment. The interconnect 706 connects the CPU 702 and the memory 704 to the input devices 708, the output devices 710, and the network access circuitry 712. The input devices 708 can include, for example, a keyboard, a keypad, a touch-sensitive screen, a mouse, a microphone, and/or one or more cameras. The output devices 710 can include, for example, a display-such as a liquid crystal display (LCD)—and/or one or more loudspeakers. The network access circuitry 712 sends and receives data through computer networks such the network 106 (FIG. 1).

Optionally, since the restricted access server 108 is a server computer, the input devices 708 and the output devices 710 can be omitted and the restricted access server 108 can interact with one or more human users exclusively through network access circuitry 712, e.g., through a remote command shell protocol such as the known 'ssh' remote command shell protocol.

A number of components of the restricted access server 108 are stored in the memory 704. In particular, the restricted access server logic 714, including the restricted feature logic 716, is all or part of one or more computer processes executing within CPU 702 from memory 704 in this illustrative embodiment but can also be implemented using digital logic circuitry. A zone data 718 and a restricted features data 720 are data stored persistently in the memory 704. The zone data 716 and the restricted features data 720 can be organized as one or more databases.

The restricted access server logic 714 can interface with the application logic 514 to deliver features requested by the applications implemented by the application logic 514. For example, the restricted access server logic 114 can interface with the application logic 514 to deliver game features, music features, documents, and/or any other type of content utilized by the application logic 514.

Optionally, the restricted access server logic 714 can also receive data from the computing device 102 and verify that the computing device 102 is connected to the server 108 through one of the authorized wireless access points. In an embodiment, this can be accomplished by ensuring that the data from the computing device 102 is passed through the authorized wireless access points using a local or known IP. That is, the authorized wireless access points are connected to the restricted access server 108 using the local or known IP address. In another embodiment, the determination whether the wireless access point is authorized may be based on a MAC address or device fingerprint of the wireless access point received by server 108.

Thus, in an embodiment, the data from the computing device 102 should be passed to the restricted access server 108 from the local or known IP address if the computing device 102 is connected to the restricted access server 108 through one of the authorized wireless access points. If the data from the computing device 102 is passed to the restricted access server 108 from an outside or unknown IP address, then the computing device 102 is not connected to the server 108 through one of the authorized wireless access points. Once the restricted access server logic 714 verifies that the computing device 102 is connected to the server 108 through one of the authorized wireless access points, the restricted access server logic 714 transmits the verification to the computing device 102.

The restricted server logic 714 can also include a zone data 718, which can be periodically updated. The zone data 718 is similar to the zone data 518, except the zone data 718 is updated by the restricted server logic 714. The restricted server logic 714 can periodically transmit the zone data 718 to the computing device 102 so that the computing device 102 can update the zone data 518 using the zone data 718.

When the computing device 102 is not located within the restricted access zone 110, or if the user does not wish to enter the zone mode, the application logic 514 can allow certain features which are not restricted features. For example, in the case of wagering, the application logic 514 can implement a non-zone mode in which wagering is not permitted or is virtual at best. As used herein, virtual wagering is wagering of things without monetary value, such as points for example.

The restricted server logic 714 can also include a restricted features logic 716. The restricted feature logic 716 delivers the restricted features to the computing device 102 when the computing device 102 is located within the restricted access zone 110. In the case of wagering, the restricted features logic 716 can, for example, track the winnings and losses of individual computing devices and can also credit and debit financial accounts accordingly.

The restricted features logic 716 can also include restricted data stored in a restricted features data 720. Such restricted data can include, for example, gambling data, music data, selective access document data, and/or any other content which should only be delivered to the computing device 102 when the computing device 102 is located within the restricted access zone 110. In an embodiment, the restricted features data 720 also stores gaming status data and personal preferences of each individual that plays games as served by restricted access server 108. The restricted features data 720 can also include financial account information for proper crediting and debiting in accordance with winnings and losses. Since gaming status data and personal preferences are preserved, the gaming experience through the computing device 102 is virtually identical whether wagering or not, and therefore within and outside the restricted access zone 110 such as casinos.

In an embodiment, the restricted server logic 714 can also coordinate interactions between multiple computing devices, allowing users to interact with each other. For example, in the case of gambling, the restricted server logic 714 may coordinate, for example, a poker game.

Figure 8:
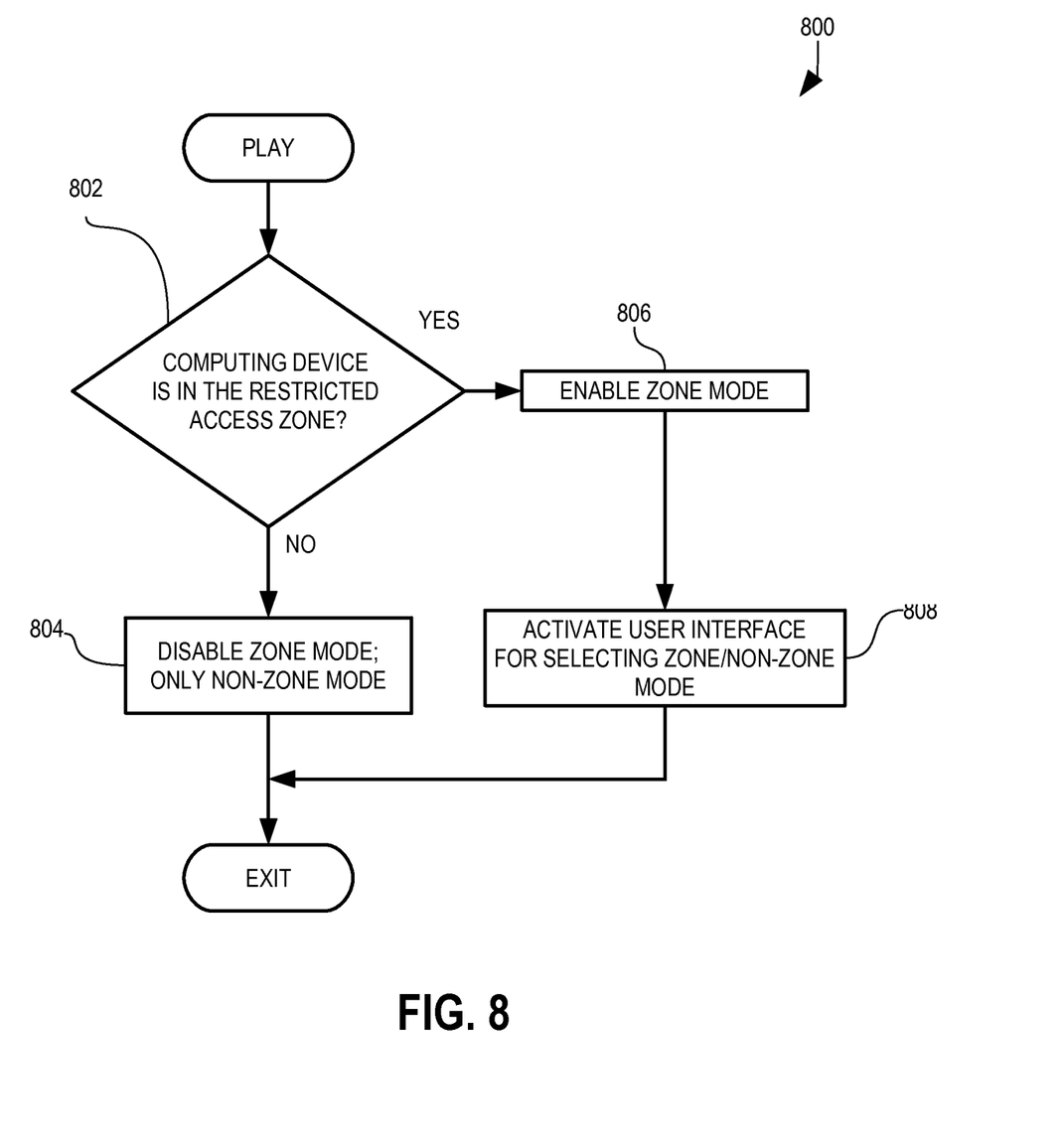
FIG. 8 is a logic flow diagram illustrating one method according to the invention for enabling a zone mode when the computing device is located within a restricted access zone and otherwise disabling the zone mode when the computing device is not located within the restricted access zone.

In an embodiment, the present invention can be a process 800 as shown in FIG. 8. With respect to the process 800, an example will be used wherein the restricted zone 110 is a casino and in a zone mode, wagering is allowed by the computing device 102, and in a non-zone mode, wagering is not allowed by the computing device 102. However, as disclosed above, it is understood that the restricted zone need not be a casino, and the zone mode need not allow wagering, but instead could allow other features.

In step 802, a determination is made as to whether the computing device is in the restricted access zone. For example, the zone restricting logic 516 determines whether the computing device 102 is located within the restricted access zone 110. Thus, the zone restricting logic 516 can determine whether the computing device 102 is located in the casino.

If, in step 802 the computing device 102 is not within the restricted access zone 110, then the zone mode is disabled (or made unavailable) and only the non-zone mode is enabled in step 804. For example, the zone restricting logic 516 can disable the zone mode of the computing device 102 so that the computing device can only operate in the non-zone mode. Thus, the computing device 102 can have a wagering mode disabled, such that the computing device is not able to wager.

Conversely, if the zone restricting logic 516 determines in step 802 that the computing device 102 is within the restricted access zone 110, the zone restricting logic 516 enables the zone mode of the computing device 102 in step 806. For example, the computing device 102 can operate in the zone mode, and the application logic 514 can allow restricted features. Thus, the computing device 102 will be able to operate in the wagering mode once it is inside the casino, and the user can place wagers.

In step 808, a user interface can be displayed in the computing device 102 to allow the user to select whether the user desires the computing device to be in the zone mode or the non-zone mode. For example, the zone restricting logic 516 may display a user interface in the computing device 102 to allow the user to select whether the user desires the computing device to be in the zone mode or the non-zone mode. This can allow, for example, the user to decide whether the computing device 102 should enter the zone mode or remain in the non-zone mode, even when the computing device 102 is in the casino. For example, even though the user may be inside the casino, she may not wish to place wagers, and may desire that the computing device 102 should operate in the non-wager mode to prevent accidental wagers. Optionally, the computing device 102 can automatically enter the zone mode once the zone mode is enabled.

After step 804 or step 808, the process 800 completes. Step 802 of process 800 is shown in greater detail in FIG. 9. Similar to FIG. 8 and for illustrative purposes, the restricted zone 110 is a casino and in a zone mode, wagering can be allowed by the computing device 102, and in a non-zone mode, wagering cannot be allowed by the computing device 102.

Figure 9:
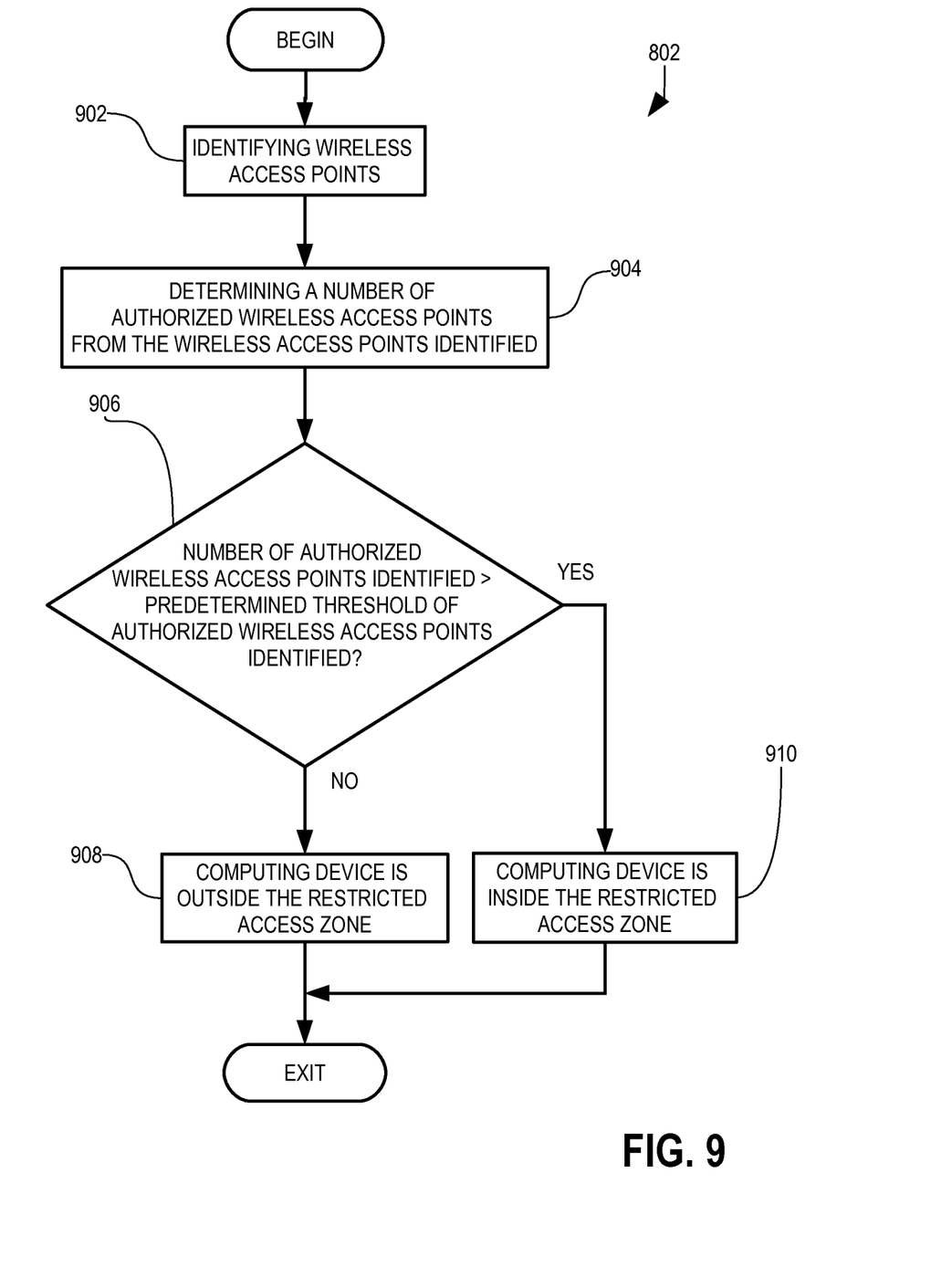
FIG. 9 is a logic flow diagram illustrating how to determine whether the computing device is located within the restricted access zone in accordance with one embodiment of the invention.

In step 902, the wireless access points are identified. For example, the computing device 102 can identify wireless access points using the zone restricting logic 516. In an embodiment, the computing device 102 identifies only wireless access points which have a signal strength greater than the predetermined signal strength threshold 606.

In step 904, a number of authorized wireless access points are determined from the wireless access points identified. For example, the computing device 102 can determine the authorized wireless access points from the wireless access points using the zone restricting logic 516. The computing device 102 can receive wireless access point identifiers from the wireless access points, with or without connecting to the server 108 through one of the wireless access points, and compare the wireless access point identifiers with the authorized wireless access point identifiers 602 to determine the authorized wireless access points. The computing device 102 can then determine the number of authorized wireless access points.

In step 906, a determination is made as to whether a number of authorized wireless access points identified satisfies a predetermined threshold. For example, the computing device 102 can determine, utilizing the zone restricting logic 516, whether the number of authorized wireless access points identified is at least as many as the predetermined threshold stored in memory location 604.

If the number of authorized wireless access points identified satisfies the predetermined threshold of authorized wireless access points identified 604, then the process proceeds to step 910. In step 910, the computing device is determined to be inside the restricted access zone. For example, the computing device 102 can be determined to be inside the casino.

However, if the number of authorized wireless access points identified is not at least the predetermined threshold of authorized wireless access points identified 604, then the process proceeds to step 908. In step 908, the computing device is determined to be outside the restricted access zone. For example, the computing device 102 can be determined to be outside the casino.

It should be appreciated that, while the particular context for which zone-restricted behavior is enforced in this illustrative example is wagered gaming, zone-restricted behavior is enforced in the manner described herein can be used in numerous other contexts. Some of these contexts involve other types of legal constraints. For example, a bar or saloon might want to provide on-line drink ordering but only for those already in the bar or saloon and not to people outside who have not been verified to be of legal drinking age. Other contexts are for added security and privacy. A number of entities provide Internet access for visitors. Examples include stores that provide customers with Internet access, businesses in which visiting clients or vendors or associates might need Internet access, and private homes in which the owner provides an open Internet connection for visiting friends and family. Each of these entities may prefer to limit Internet access to devices that are physically within a building or zone to prevent unauthorized people from tapping into their local area networks from just outside the building or zone.

The invention may be exploited, for example, at a music festival where digitized music is streamed within a restricted area (such as the boundaries of an outdoor music festival) for reception by devices located within the restricted area, to ensure that only paying customers can receive the live transmission. The invention may also be exploited in high-security areas, such as within a military field headquarters, or within a nuclear power generating facility, to ensure that users can only access certain documents, doors, servers, or other equipment via their computing device when the computing device is located within a secure zone.

The above description is illustrative only and is not limiting. The present invention is defined solely by the claims which follow and their full range of equivalents. It is intended that the following appended claims be interpreted as including all such alterations, modifications, permutations, and substitute equivalents as fall within the true spirit and scope of the present invention.

What is claimed is:

1. A system for implementing zone-restricted behavior of a computing device, the system comprising:
   a processor;
   a memory coupled to the processor and containing computer readable instructions that when executed by the processor perform the following steps:
      identifying wireless access points using the computing device;
      calculating, by the computing device, a total quantity of a plurality of authorized wireless access points from the identified wireless access points by receiving digital fingerprints of the identified wireless access points and comparing each of the received digital fingerprints to digital fingerprints of authorized wireless access points, wherein each of said identified wireless access points having a received digital fingerprint that matches one of said digital fingerprints of authorized wireless access points is deemed to be an authorized wireless access point;
      determining that the computing device is located within a restricted access zone when said total quantity of a plurality of authorized wireless access points accessible by the computing device from a fixed location exceeds a predetermined threshold of a plurality of authorized wireless access points; and
      enabling a zone mode of the computing device when the computing device is determined to be located within the restricted access zone.

2. The system of claim 1 wherein the steps further comprise:
   connecting the computing device through one of the authorized wireless access points to a restricted access server; and
   receiving verification from the restricted access server that the computing device is connected through one of the authorized wireless access points,
   wherein the step of determining that the computing device is located within the zone further includes:
   determining that the computing device is located in the restricted access zone responsive to receiving verification from the restricted access server.

3. A system for implementing zone-restricted behavior of a mobile computing device seeking access to a network server, the system comprising:
   the mobile computing device including a processor;
   memory stored on the mobile computing device and containing instructions that when executed by the processor perform the following steps:
      detecting signal strength of each of a plurality of wireless access points;
      for each of said plurality of wireless access point having signal strength above a predetermined threshold, receiving a digital fingerprint of the wireless access points and comparing the digital fingerprint to digital fingerprints of authorized wireless access points wherein each of said plurality of wireless access points having a digital fingerprint that matches one of said digital fingerprints of authorized wireless access points is deemed to be an authorized wireless access point;

calculating, by the computing device, a total quantity of a plurality of authorized wireless access points;

determining that the mobile computing device is located within a restricted access zone when said total of a plurality of authorized wireless access points exceeds a predetermined threshold; and enabling a zone mode of the computing device when the computing device is determined to be located within the restricted access zone.

4. The system of claim 1 wherein the step of identifying wireless access points includes:

identifying only wireless access points which have a signal strength greater than a predetermined signal strength threshold.

5. The system of claim 1 wherein enabling the zone mode unlocks features of an application on the computing device.

6. The system of claim 1, wherein the steps further comprise providing a user interface on said computing device that enables a user to select whether said computing device is permitted to operate in said zone mode.

7. The system of claim 3, wherein the steps further comprise providing a user interface on said computing device that enables a user to select whether said computing device is permitted to operate in said zone mode.

8. A non-transitory computer readable medium containing instructions that, when executed by a processor coupled to a computing device, perform the following steps:

identifying wireless access points using the computing device;

calculating, by the computing device, a total quantity of a plurality of authorized wireless access points from the identified wireless access points by receiving digital fingerprints of the identified wireless access points and comparing each of the received digital fingerprints to digital fingerprints of authorized wireless access points, wherein each of said identified wireless access points having a received digital fingerprint that matches one of said digital fingerprints of authorized wireless access points is deemed to be an authorized wireless access point;

determining that the computing device is located within a restricted access zone when said total quantity of a plurality of authorized wireless access points accessible by the computing device from a fixed location exceeds a predetermined threshold of a plurality of authorized wireless access points; and enabling a zone mode of the computing device when the computing device is determined to be located within the restricted access zone.

9. The non-transitory computer readable medium of claim 8 wherein the steps further comprise:

connecting the computing device through one of the authorized wireless access points to a restricted access server; and receiving verification from the restricted access server that the computing device is connected through one of the authorized wireless access points, wherein the step of determining that the computing device is located within the zone further includes:

determining that the computing device is located in the restricted access zone responsive to receiving verification from the restricted access server.

10. A non-transitory computer readable medium containing instructions for implementing zone-restricted behavior of a mobile computing device seeking access to a network server, the instructions when executed by a processor coupled to the mobile computing device causing performance of the following steps:

detecting signal strength of each of a plurality of wireless access points;

for each of said plurality of wireless access point having signal strength above a predetermined threshold, receiving a digital fingerprint of the wireless access points and comparing the digital fingerprint to digital fingerprints of authorized wireless access points wherein each of said plurality of wireless access points having a digital fingerprint that matches one of said digital fingerprints of authorized wireless access points is deemed to be an authorized wireless access point;

calculating, by the computing device, a total quantity of a plurality of authorized wireless access points;

determining that the mobile computing device is located within a restricted access zone when said total of a plurality of authorized wireless access points exceeds a predetermined threshold; and enabling a zone mode of the computing device when the computing device is determined to be located within the restricted access zone.

11. The non-transitory computer readable medium of claim 8 wherein the step of identifying wireless access points includes:

identifying only wireless access points which have a signal strength greater than a predetermined signal strength threshold.

12. The non-transitory computer readable medium of claim 8 wherein enabling the zone mode unlocks features of an application on the computing device.

13. The non-transitory computer readable medium of claim 8, wherein the steps further comprise providing a user interface on said computing device that enables a user to select whether said computing device is permitted to operate in said zone mode.

14. The non-transitory computer readable medium of claim 10, wherein the steps further comprise providing a user interface on said computing device that enables a user to select whether said computing device is permitted to operate in said zone mode.

* * * * *